United States Patent
Yamashita et al.

(10) Patent No.: US 7,183,682 B2
(45) Date of Patent: Feb. 27, 2007

(54) MOTOR HAVING SPEED REDUCER AND CONTROL CIRCUIT

(75) Inventors: Tomoki Yamashita, Kosai (JP); Wataru Kanou, Kosai (JP)

(73) Assignee: Asmo Co., Ltd., Shizuoka-pref (JP)

( * ) Notice: Subject to any disclaimer, the term of this patent is extended or adjusted under 35 U.S.C. 154(b) by 0 days.

(21) Appl. No.: 11/151,346

(22) Filed: Jun. 14, 2005

(65) Prior Publication Data
US 2005/0280324 A1    Dec. 22, 2005

(30) Foreign Application Priority Data
Jun. 18, 2004    (JP)    ............... 2004-181571

(51) Int. Cl.
*H02K 7/10* (2006.01)
*H02K 11/00* (2006.01)
*H02K 5/00* (2006.01)

(52) U.S. Cl. .............. 310/75 R; 310/83; 310/89; 310/68 R

(58) Field of Classification Search ............. 310/75 R, 310/80, 83, 68 B, 71
See application file for complete search history.

(56) References Cited

U.S. PATENT DOCUMENTS

| 3,440,592 | A | * | 4/1969 | Zelle | 310/71 |
|---|---|---|---|---|---|
| 3,440,594 | A | * | 4/1969 | Hopp et al. | 310/71 |
| 5,218,255 | A | * | 6/1993 | Horiguchi | 310/71 |
| 5,747,903 | A | * | 5/1998 | Klingler | 310/75 R |
| 5,864,188 | A | * | 1/1999 | Gerrand et al. | 310/71 |
| 6,445,104 | B1 | * | 9/2002 | Sato | 310/71 |
| 6,710,484 | B2 | * | 3/2004 | Kitoh et al. | 310/83 |
| 6,756,711 | B2 | | 6/2004 | Matsuyama et al. | |
| 6,803,687 | B2 | * | 10/2004 | Murakami et al. | 310/71 |
| 6,861,776 | B2 | * | 3/2005 | Hashimoto | 310/71 |
| 6,903,473 | B2 | * | 6/2005 | Matsuyama et al. | 310/71 |
| 2002/0079758 | A1 | * | 6/2002 | Matsuyama et al. | 310/68 R |
| 2003/0137202 | A1 | * | 7/2003 | Mao et al. | 310/68 R |

FOREIGN PATENT DOCUMENTS

JP    A-2002-59739    2/2002

* cited by examiner

*Primary Examiner*—Burton S. Mullins
*Assistant Examiner*—Erik Preston
(74) *Attorney, Agent, or Firm*—Posz Law Group, PLC

(57) ABSTRACT

A motor has a motor unit, an output shaft, a speed-reducing unit for controlling the motor unit, a control circuit board and a gear housing. The speed-reducing unit transmits a rotation of the rotation shaft of the motor unit to the output shaft to rotate slower than the rotation shaft. The gear housing is fixed to the motor unit and includes a generally flat shaped speed-reducing unit receiving portion, which installs at least a part of the speed-reducing unit therein, and a generally flat shaped circuit board receiving portion, which installs the control circuit board therein. The output shaft protrudes beyond and perpendicularly to a side face of the speed-reducing unit receiving portion. The circuit board receiving portion is inclined to the speed-reducing unit receiving portion around a center axis of the rotation shaft to be retracted from an output shaft side of the speed-reducing unit receiving portion.

13 Claims, 4 Drawing Sheets

MOTOR HAVING SPEED REDUCER AND CONTROL CIRCUIT

CROSS REFERENCE TO RELATED APPLICATION

This application is based upon and claims the benefit of priority of Japanese Patent Application No. 2004-181571 filed on Jun. 18, 2004, the content of which is incorporated herein by reference.

FIELD OF THE INVENTION

The present invention relates to a motor having speed reducer and control circuit, and especially the motor suitable for a driving power source of a vehicular power window system and the like.

BACKGROUND OF THE INVENTION

A motor having a speed-reducing unit (a worm shaft and a worm wheel) is generally used as a drive power source of a power window system of a vehicle. In such a motor, a motor unit is connected to the speed-reducing unit that reduces rotational speed of the motor unit. The motor unit and the speed-reducing unit are installed in a housing. The motor for a power window system is disposed between an inner panel and an outer panel of a vehicular door. An output shaft of the motor is engaged with a window regulator. A driving power of the motor is transmitted via the window regulator to open and close a window glass (refer to JP-2002-059739-A, for example).

Currently, the above-described motor has a control circuit board to control the motor unit in accordance with a control scheme such as a pinch-free control for the power window system. The housing of the motor further has a circuit board receiving portion to install the control circuit board therein (refer to U.S. Pat. No. 6,756,711-B and its counterpart JP-2002-262516-A). The motor disclosed in U.S. Pat. No. 6,756,711-B has Hall elements, IC, and so on disposed on the control circuit board to control a current supplied to the motor unit so as to prevent a pinching of a power window.

The above-described motor is commonly mounted in a narrow space. For instance, the motor for a power window system is disposed in a narrow space between the inner panel and the outer panel of the vehicular door. In order to install the motor having the control circuit board and the circuit board receiving portion enclosing the control circuit board, a component arrangement is difficult to prevent the circuit board receiving portion from interfering with the window regulator. Especially, in a case that the motor for a power window system is to be mounted on many types of vehicle, which have window regulators customized for respective types of vehicle, the component arrangement must be modified in accordance with the window regulators of respective types of vehicle.

SUMMARY OF THE INVENTION

The present invention, in view of the above-described issues, has an object to provide a motor having a speed-reducing mechanism, a control circuit board for controlling an operation thereof and a structure capable of preventing a housing installing the control circuit board therein from interfering with a member driven thereby.

The motor has a motor unit, an output shaft, a speed-reducing unit for controlling the motor unit, a control circuit board and a gear housing. The speed-reducing unit transmits a rotation of the rotation shaft of the motor unit to the output shaft to rotate slower than the rotation shaft. The gear housing is fixed to the motor unit and includes a generally flat shaped speed-reducing unit receiving portion, which installs at least a part of the speed-reducing unit therein, and a generally flat shaped circuit board receiving portion, which installs the control circuit board therein. The output shaft protrudes beyond and perpendicularly to a side face of the speed-reducing unit receiving portion. The circuit board receiving portion is inclined to the speed-reducing unit receiving portion around a center axis of the rotation shaft to be retracted from an output shaft side of the speed-reducing unit receiving portion.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

A preferred embodiment of the present invention will be described hereinafter with reference to FIGS. 1 to 5. A motor 1 according to the present embodiment is used as a drive source of a power window system of a vehicle.

Figure 1:
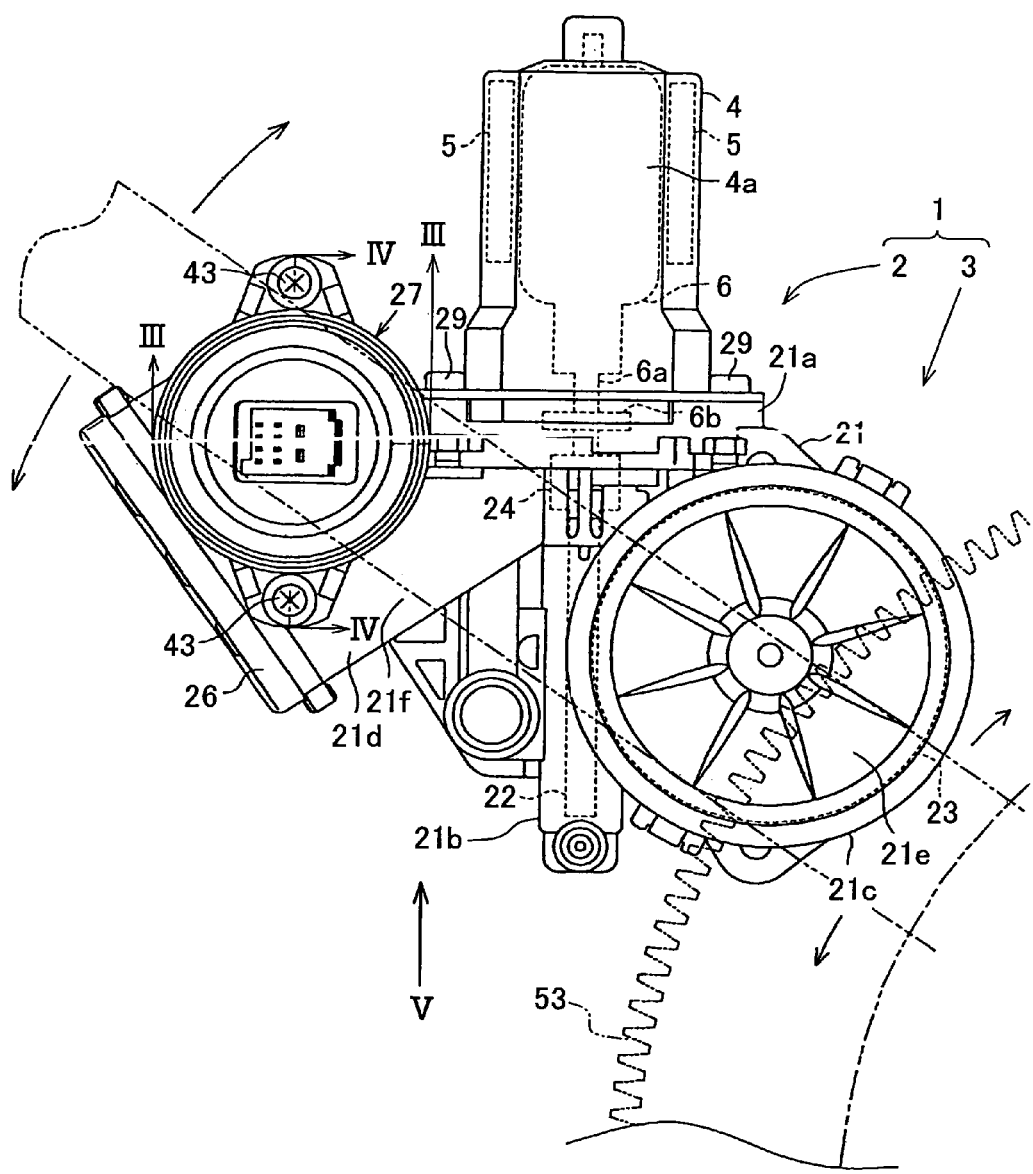
FIG. 1 is a plan view showing a structure of a motor according to an embodiment of the present invention.
Figure 2:
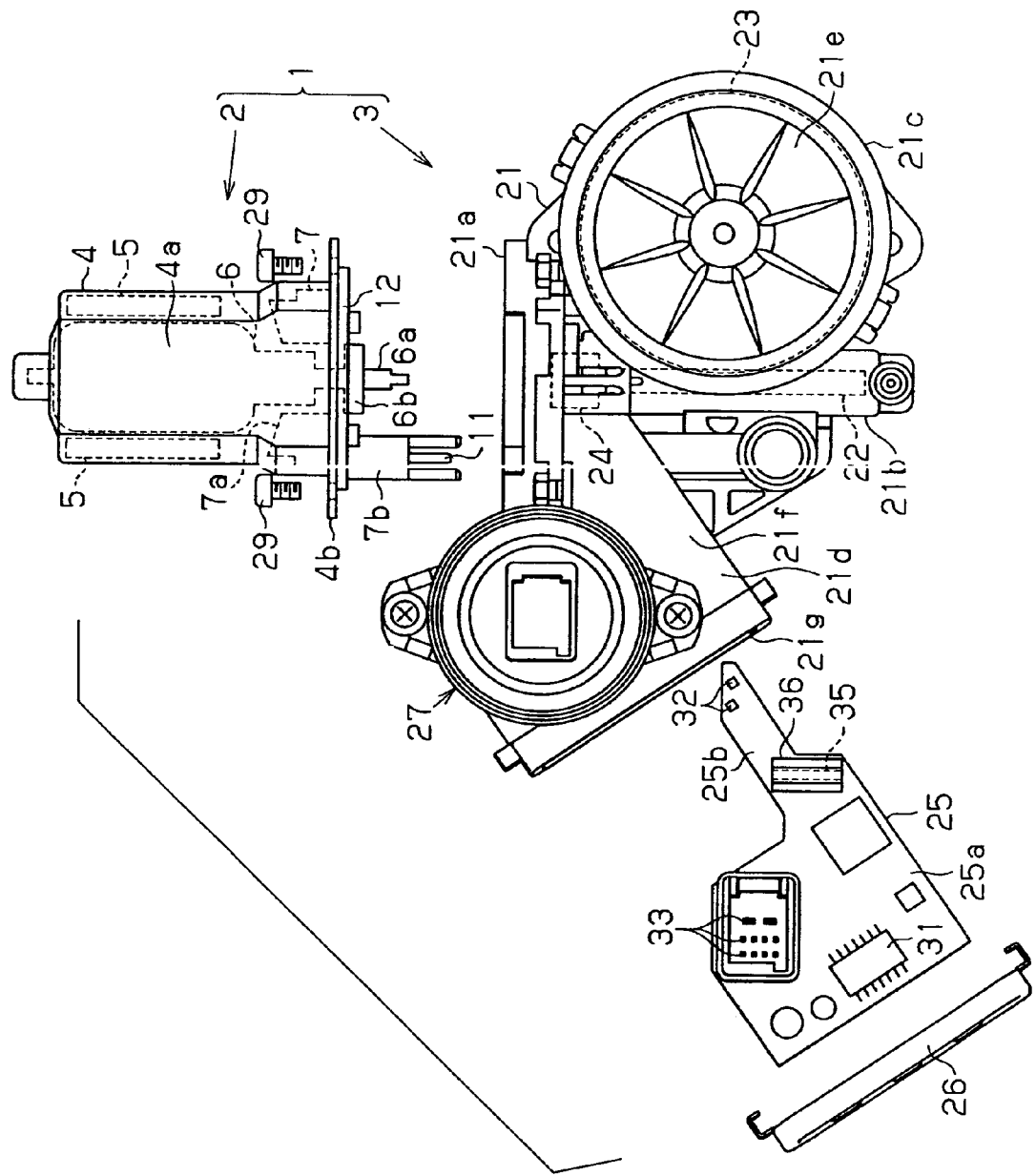
FIG. 2 is an exploded view of the motor according to the embodiment.

As shown in FIGS. 1 and 2, the motor 1 has a motor unit 2 and a speed-reducing unit 3 for reducing a rotational speed of the motor unit 2.

The motor unit 2 includes a yoke housing 4, a pair of magnets 5, an armature 6 having a rotation shaft 6a, a brush holder 7 (refer to FIG. 2) and a pair of brushes (not shown). The yoke housing 4 has an approximately cylindrical shape. A circumferential face of the yoke housing 4 has a pair of flat faces 4a opposed to each other. The yoke housing 4 also has a blocked portion and an opening portion at both ends in an axial direction thereof.

The brush holder 7 is made of resinous material. As shown in FIG. 2, the brush holder 7 has a holder body 7a and a terminal holder 7b which are integrally formed. The brushes is installed in the opening portion of the yoke housing 4 and held by the holder body 7a. The terminal holder 7b protrudes outward from the opening portion of the yoke housing 4 in an axial direction of the yoke housing 4. The terminal holder 7b is disposed alongside of the rotation shaft 6a (to the left of the rotation shaft 6a in FIG. 2) in a radial direction of the yoke housing 4. Thus, the terminal holder 7b and the rotation shaft 6a are aligned in a direction parallel to the flat faces 4a of the yoke housing 4.

A plurality of terminals are integrally formed with the brush holder 7 by insert molding. One end portions of the terminals are electrically connected via pigtails to the brushes. The other end portions of the terminals protrude beyond the terminal holder 7b to form connection terminals 11 of the motor unit 2. Further, a seal member 12, which is made of elastomer, is fixed to the brush holder 7 to seal the opening portion of the yoke housing 4, that is, a flange portion 4b of the yoke housing 4. Further, a sensor magnet 6b is fixed to a tip portion (lower portion in FIGS. 1 and 2) of the rotation shaft 6a to rotate integrally with the rotation shaft 6a.

Figure 5:
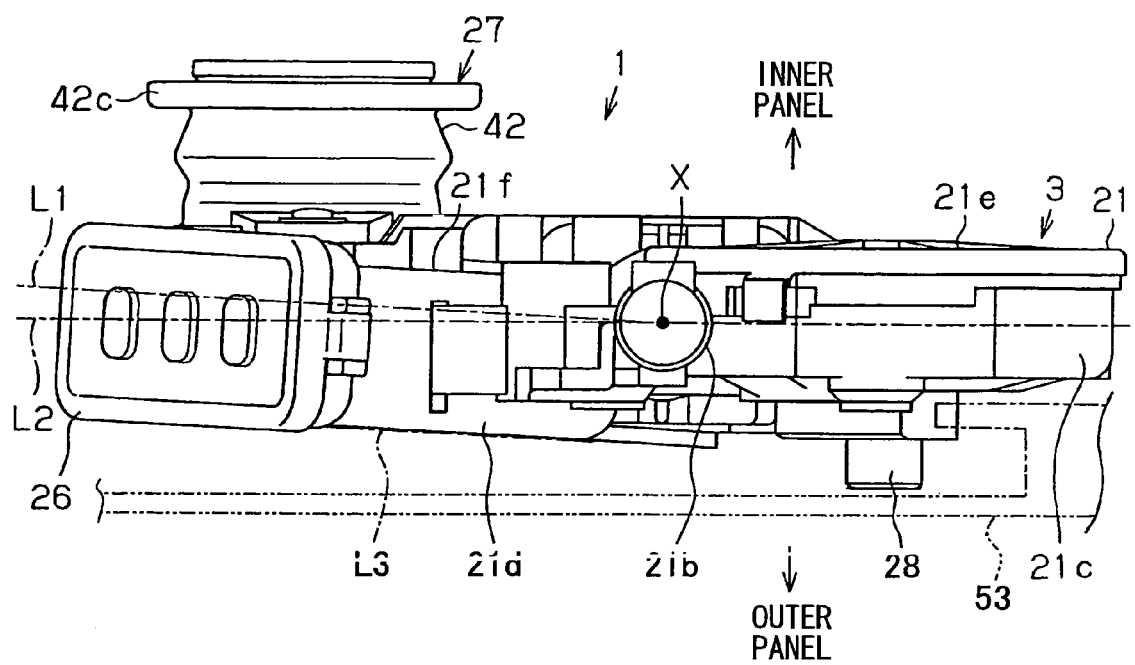
FIG. 5 is a side view of the motor seen in a direction of an arrow V in FIG. 1.

The speed-reducing unit 3 has a gear housing 21, a worm shaft 22, a worm wheel 23, a clutch 24, a control circuit board 25 (refer to FIG. 2), a cover 26, a mount member 27 and an output shaft 28 (refer to FIG. 5). The worm shaft 22 and the worm wheel 23 form a speed-reducing mechanism of the motor 1.

The gear housing 21 is made of resinous material. The gear housing 21 includes a connection portion 21a, a worm shaft receiving portion 21b, a worm wheel receiving portion 21c and a circuit board receiving portion 21d. The worm wheel receiving portion 21c, which installs the worm wheel 23, that is, a part of the speed-reducing mechanism therein, forms a speed-reducing mechanism receiving portion.

The connection portion 21a has a shape adaptable to the flange portion 4b formed at the opening portion of the yoke housing 4 to be fixed to the flange portion 4b by screws 29.

The worm shaft receiving portion 21b has a cylindrical shape to extend on a center axis X of the rotation shaft 6a and rotatably supports the worm shaft 22 therein. The worm shaft receiving portion 21b disposes the clutch 24 at a motor unit 2-side thereof to transmit rotational force of the rotation shaft 6a to the worm shaft 22. The clutch 24, however, prevents rotational force of the worm shaft 22 from being transmitted to the rotation shaft 6a by locking the worm shaft 22. That is, the clutch 24 prevents rotational force of a driven side from rotating a driving side.

Figure 3:
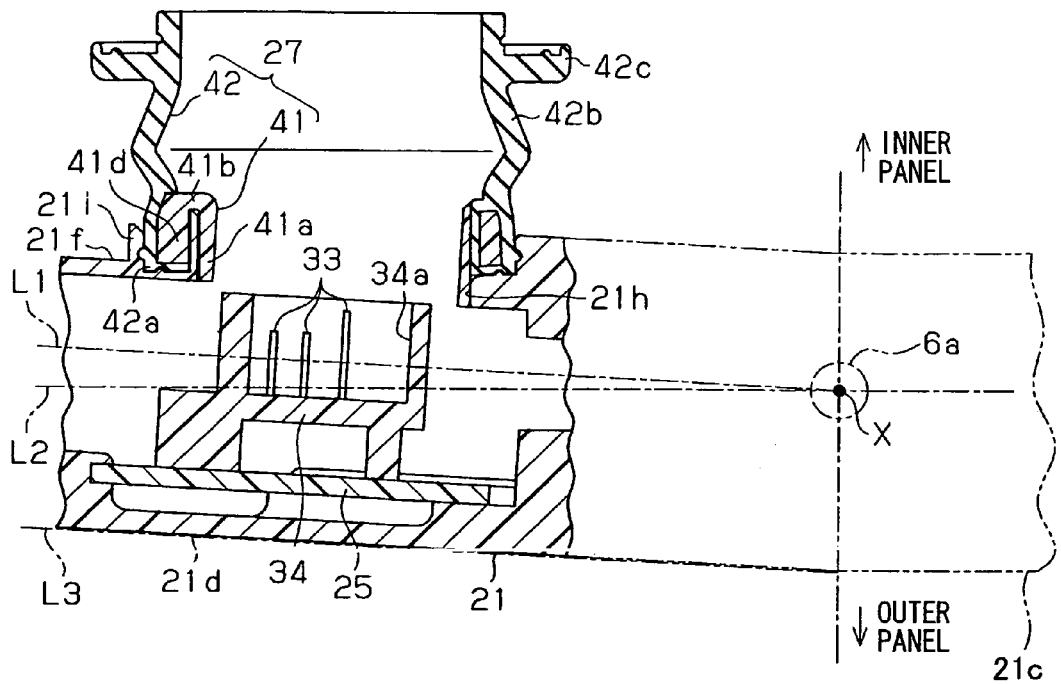
FIG. 3 is a cross-sectional view of the motor taken along a line III—III in FIG. 1.

The worm wheel receiving portion 21c has a flat disc shape to extend in parallel with an imaginary plane L2 which is defined to include the center axis X of the rotation shaft 6a as shown in FIGS. 3 and 5. The worm wheel receiving portion 21c rotatably supports the worm wheel 23 therein. An inner space of the worm shaft receiving portion 21b and an inner of the worm wheel receiving portion 21c communicates with each other. The worm shaft 22 and the worm wheel 23 are engaged with each other in the worm shaft receiving portion 21b and the worm wheel receiving portion 21c. The worm wheel receiving portion 21c is formed at an opposite side from the terminal holder 7b with respect to the worm shaft receiving portion 21b (to the right of the worm shaft receiving portion 21b in FIG. 2). Both side faces 21e of the worm wheel receiving portion 21c extend in parallel with the flat faces 4a of the yoke housing 4. The output shaft 28 protrudes beyond one (lower one in FIG. 5) of the flat faces 21e in a direction perpendicular to the side faces 21e. The output shaft 28 is fixed to and integrally rotates with the worm wheel 23. The output shaft 28 is engaged with a window regulator 53 to drive the power window system.

The circuit board receiving portion 21d has a flat shape to extend in parallel with an imaginary plane L1 which is defined to include the center axis X of the rotation shaft 6a. The circuit board receiving portion 21d is formed at an opposite side from the worm wheel receiving portion 21c with respect to the worm shaft receiving portion 21b, in accordance with positions of the connection terminals 11 and the terminal holder 7b of the motor unit 2. As shown in FIGS. 3 and 5, both side faces 21f of the circuit board receiving portion 21d, which interpose the first imaginary plane L1 therebetween, is inclined to the side faces 21e of the worm wheel receiving portion 21c, which interpose the second imaginary plane L2 therebetween. Specifically, the first imaginary plane L1 is inclined to the second imaginary plane L2 so that the circuit board receiving portion 21f comes closer to the mount member 27 and has a larger clearance to the window regulator 53 disposed at an opposite side from the mount member 27 with respect to the worm wheel receiving portion 21d. A third imaginary plane L3, which is defined to include one (lower one in FIG. 5) of the side faces 21f closer to the window regulator 53, is also inclined to the second imaginary plane L2 so that the circuit board receiving portion 21f has a larger clearance to the window regulator 53.

As described above, both the first and second imaginary planes L1, L2 include the center axis X of the rotation shaft 6a. That is, the first imaginary plane L1 is inclined to the second imaginary plane L2 around the center axis X of the rotation shaft 6a. The first and second imaginary planes L1, L2 meet at 3 degrees of angle.

Figure 4:
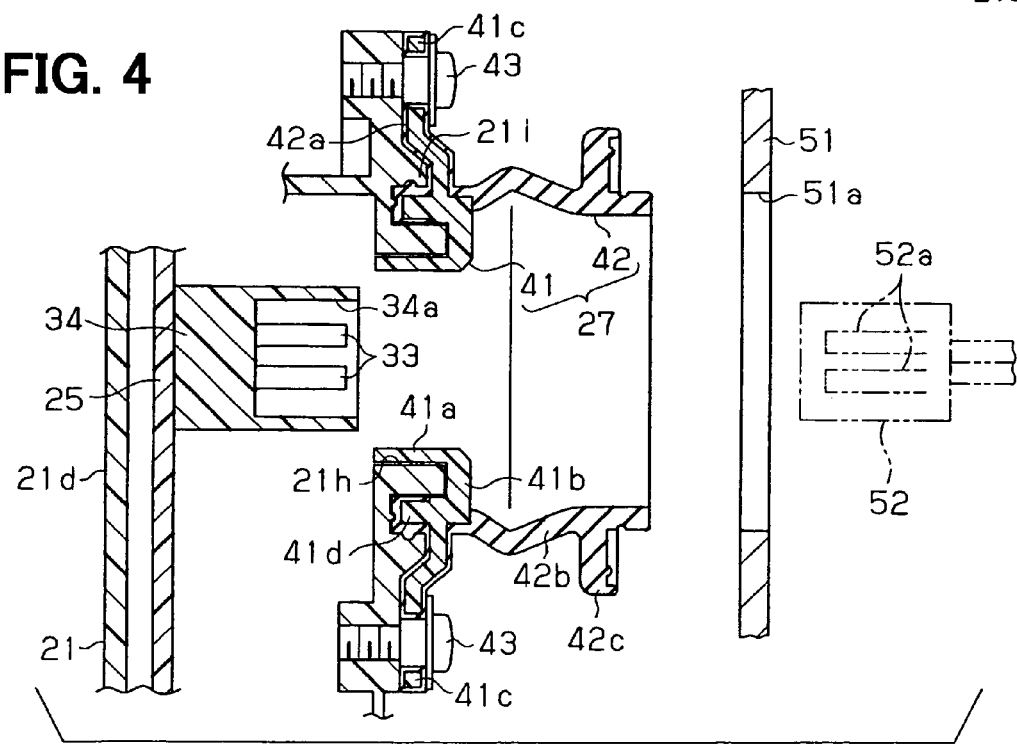
FIG. 4 is another cross-sectional view of the motor taken along a line IV—IV in FIG. 1.

An inner space of the circuit board receiving portion 21d communicates with the opening portion of the yoke housing 4a in which the sensor magnet 6b is disposed. As shown in FIG. 2, the circuit board receiving portion 21d has an insertion hole 21g through which the control circuit board 25 is inserted. As shown in FIGS. 3 and 4, the circuit board receiving portion 21d further has an approximately rectangular shaped opening 21h on one (upper one in FIG. 5) of the side faces 21f on a side of the mount member 27 and an annular shaped fitting projection 21i around the opening 21h.

The circuit board receiving portion 21d installs the control circuit board 25 therein. As shown in FIG. 2, the control circuit board 25 has an approximately rectangular shaped main portion 25a and an extending portion 25b extending from a corner of the main portion 25a in parallel with a side of the main portion 25a. The control circuit board 25 is provided with an IC 31, a pair of Hall elements 32, external connection terminals 33, an external connection terminal block 34, internal connection terminals 35 and an internal connection terminal block 36, etc. thereon. The control circuit board 25 detects a rotational speed of the sensor magnet 6b, that is, a rotational speed of the rotation shaft 6a by magnetic field detected by the Hall elements 32 disposed at a tip of the extending portion 25b. The IC 31 on the control circuit board 25 determines whether a power window driven by the motor 1 pinches any object or not, based on the rotational speed of the rotation shaft 6a. When the IC 31 determines the power window pinches any object, the IC 31 operates to supply a reverse current to the motor unit 2 to open the window. Thus, the motor 1 serves an automatic reversal function of the power window system.

As shown in FIGS. 3 and 4, the external connection terminals 33 are exposed in the opening 21h. The external connection terminal block 34 holds the external connection terminals 33 perpendicular to the control circuit board 25. The external connection terminal block 34 has an approximately rectangular parallelepiped shape and perpendicularly fixed on the control circuit board 25. The external connection terminal block 34 has a concave connector portion 34a at a top portion thereof. The external connection terminals 33 protrude upward from a bottom face of the concave connector portion 34a.

As shown in FIG. 2, the internal connection terminals 35 are connected to the connection terminals 11 of the motor unit 2. The internal connection terminals 35 are female to insert the connection terminals 11 thereinto. The internal connection terminal block 36 fixed on the control circuit board 25 has a shape to dispose the internal connection terminals 35 in parallel and coaxial with the connection terminals 11 of the motor unit 2.

The control circuit board 25 is inserted through the insertion hole 21g into the circuit board receiving portion 21d to be in parallel with the first and third imaginary planes L1 and L3. Then the motor unit 2 is fixed to the gear housing 21 to electrically connect the connection terminals 11 of the motor unit 2 to the internal connection terminals 35.

The cover 26 is put to the circuit board receiving portion 21d of the gear housing 21 to block the insertion hole 21g. The cover 26 is made of metallic material and has a bended edge fitting to an outer circumference of the insertion hole 21g.

The mount member 27 is joined to the opening 21h of the circuit board receiving portion 21d of the housing body 21. Specifically, as shown in FIGS. 3 and 4, the mount member 27 includes an inner fitting member 41 and a cylindrical seal member 42. The inner fitting member 41 is made of resinous material and has a body portion 41a, a flange 41b and a pair of fixing portions 41c as shown in FIG. 4. The body portion 41a has an approximately rectangular tube shape to fit in the opening 21h of the circuit board receiving portion 21d. The flange 41b extends radially outward from an axial end of the body portion 41a. The flange 41b is provided with a fitting portion 41d to be engaged with the fitting wall 21i around the opening 21g.

The cylindrical seal member 42 has an opening seal portion 42a and a cylindrical portion 42b. The openinq seal portion 42a extends over the fixing portion 41c and the fitting portion 41d. The cylindrical portion 42b extends from the opening seal portion 42a toward an opposite side from the body portion 41a with respect to the flange portion 41b. An intimate contact flange 42c extends radially outward on an outer circumference of a tip part of the cylindrical portion 42b.

As shown in FIG. 4, the mount member 27 is fixed on the circuit board receiving portion 21d of the housing body 21 so as to fit the body portion 41a of the insert part 41 in the opening 21h of the circuit board receiving portion 21d. Screws 43 fasten the mount member 27 at the fixing portions 41c thereof onto the circuit board receiving portion 21d of the gear housing 21 so that the opening seal portion 42a seals a gap between the opening 21h and the inner fitting member 41.

As shown in FIG. 4, the motor 1 assembled in such a way as described above is mounted on an inner panel 51 of a door of a vehicle to be interposed between the inner panel 51 and an outer panel (not shown) of the door. Specifically, the inner panel 51 is provided with an insertion hole 51a. The tip part of the cylindrical portion 42b of the cylindrical seal member 42 is press-fitted into the insertion hole 51a so that the intimate contact flange 42c is in tight contact with a surface of the inner panel 51 around the insertion hole 51a. The motor 1 is fastened to the inner panel 51 of the door by bolts and the like (not shown).

As shown in FIG. 4, external terminals 52a of an external connector cable 52, which is led from an opposite side of the inner panel 51 from the motor 1 (from a door trim side), is electrically connected to the concave connector portion 34a of the external connection terminal block 34. The external connector cable 52 is connected to a control unit and a power source (not shown). As shown in FIG. 5, the output shaft 28 of the motor 1 is engaged with the window regulator 53 disposed perpendicular thereto so as to drive the power window system of the vehicle.

Characteristic advantages of the motor 1 according to the above-described embodiment will be described below.

(1) The first imaginary plane L1, on which the circuit board receiving portion 21d extends, and the third imaginary plane L3, on which the side face 21f of the circuit board receiving portion 21d extends, are inclined to the second imaginary plane L2, so that the circuit board receiving portion 21d comes closer to the inner panel 53 of the door. Thus, it is easy to prevent the circuit board receiving portion 21d and the cover 26 from interfering with the window regulator 53, which is perpendicularly engaged with the output shaft 28 to drive the power window system. Accordingly, a shared application of the motor 1 is possible for doors of many vehicle types without complicated design for preventing the motor 1 from interfering with the window regulator 53, which varies by the vehicle types. That is, the motor 1 is suitable for a wide variety of uses.

(2) The first imaginary plane L1 inclined to the second imaginary plane L2 around the center axis X of the rotation shaft 6a serves for locating the Hole elements 32 on the control circuit board 25, which is installed in the circuit board receiving portion 21d, and the worm wheel 23, which is installed in the worm wheel receiving portion 21c, close to the sensor magnet 6b in a simple arrangement. If the first imaginary plane L1 is inclined to the second imaginary plane L2 the around another axis distant from the center axis X, a complex structure is necessary to arrange the Hall elements 32 close to the sensor magnet 6b. According to the structure in the above-described embodiment, the Hall elements 32 is arranged close to the sensor magnet 6b without making the structure of the motor 1 complex.

(3) The control circuit board 25 disposed in parallel with the first imaginary plane L1 and the third imaginary plane L3, on which one of the side faces 21f of the circuit board receiving portion 21d is, serves for designing the circuit board receiving portion 21d in a constantly flat thin shape.

(4) The external connection terminals 33 extending perpendicularly to the control circuit board 25 is supported in a simple way on the control circuit board 25 by the external connection terminal block 34. That is, the simply shaped external connection terminal block 34, which has no slant face and the like, can support the external connection terminals 33.

(5) The external connection terminals 33 extending toward an approximately opposite side from the output shaft 28 serves for preventing the external connection terminals 33, the external terminals 52a and the external connector cable 52 from interfering with the window regulator 53, which is perpendicularly engaged with the output shaft 28.

(6) Housing body 21 made of resinous material to form the worm wheel receiving portion 21c and the circuit board receiving portion 21d integrally with each other serves for decreasing the number of parts.

The motor 1 described in the above-described embodiment may be modified as follows.

Firstly, in the above-described embodiment, the first imaginary plane Li, on which the circuit board receiving portion 21d extends, and the second imaginary plane L2, on which the worm wheel receiving portion extends 21c extends, meet at 3 degrees of angle. The angle, however, may be modified according to a mounting design of the motor 1 and the like.

Secondly, in the above-described embodiment, the first imaginary plane L1 is inclined to the second imaginary plane L2 around the center axis X of the rotation shaft 6a. The first imaginary plane L1, however, may be inclined to the second imaginary plane L2 around another axis apart from the center axis X of the rotation shaft 6a.

Thirdly, in the above-described embodiment, the control circuit board 25 is disposed in parallel with the first imaginary plane L1 on which the circuit board receiving portion 21d extends. The control circuit board 25, however, may be arranged in different ways. For example, the control circuit board 25 may be disposed in parallel with the second imaginary plane L2 on which the worm wheel receiving portion 21c extends.

Fourthly, in the above-described embodiment, the external connection terminals 33 are disposed perpendicular to the control circuit board 25, that is, perpendicular to the first imaginary plane L1 on which the circuit board receiving portion 21d extends. The external connection terminals 33, however, may be disposed perpendicular to the second imaginary plane L2 on which the worm wheel receiving portion 21c extends, for example. In this case, it is desirable that the external connector terminal block 34 has a different shape in accordance with the arrangement of the external connection terminals 33.

Fifthly, in the above-described embodiment, the external connection terminals 33 extend toward an opposite side from the output shaft 28 and the window regulator 53. The external connection terminals 33, however, may extend in other directions such as a direction in parallel with the first imaginary plane LI. The external connection terminals 33 may extend beyond the cover 26. In this case, it is desirable that the external connection terminal block 34, the opening 21h, the fixing member 27 and so on should have (partially) modified shapes in accordance with the arrangement of the external connection terminals 33.

Sixthly, in the above-described embodiment, the housing body 21 is made of resinous material to form the worm wheel receiving portion 21c and the circuit board receiving portion 21d integrally. The housing body 21, however, may be assembled from the worm wheel receiving portion 21c and the circuit board receiving portion 21d separately formed from each other. The housing body 21 may be made of other kinds of material than resinous material.

Seventhly, in the above-described embodiment, the present invention is applied to the motor 1 for driving the power window system. The present invention, however, is naturally applicable to any kind of motor having a speed-reducing unit and a control circuit board and to be installed in a position where the driven-side member is approximate to the motor. Further, the electric circuit devices mounted on the control circuit board to realize the pinch-free control of the power window system may be modified in accordance with types of apparatus on which the motor according to the present invention is mounted. Still further, the driven-side member (the window regulator 53), which is engaged with the output shaft 28, may be modified in accordance with the types of apparatus.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor comprising:
a motor unit having a rotation shaft;
an output shaft that is rotated by the motor unit;
a speed-reducing unit that reduces a speed of rotation supplied from the rotation shaft and transmits the rotation to the output shaft;
a control circuit board that controls the rotation of the rotation shaft; and
a gear housing fixed to the motor unit, wherein:
the gear housing includes a generally flat shaped speed-reducing unit receiving portion and a generally flat shaped circuit board receiving portion;
the speed-reducing unit receiving portion receives at least a part of the speed-reducing unit;
the output shaft extends outward beyond a side face of the speed-reducing unit receiving portion;
the circuit board receiving portion receives the control circuit board;
each of the speed-reducing unit receiving portion and the circuit board receiving portion radially extends from a center axis of the rotation shaft;
a first fictive plane, which is associated with the generally flat shape of the circuit board receiving portions, is tilted away from a second fictive plane, which is generally parallel to the center axis of the rotation shaft and is generally perpendicular to an axis of the output shaft at a leading end of the output shaft; and
a distance, which is measured between the first fictive plane and the second fictive plane in a direction parallel to the axis of the output shaft, increases in a direction radially away from the axis of the output shaft.

2. The motor according to claim 1, wherein the speed-reducing unit receiving portion and the circuit board receiving portion are connected with each other at a connection portion disposing the center axis of the rotation shaft therein.

3. The motor according to claim 1, wherein the control circuit board is installed generally in parallel with the circuit board receiving portion.

4. The motor according to claim 1, wherein the control circuit board has an external connection terminal disposed generally perpendicular to the control circuit board receiving portion.

5. The motor according to claim 1, wherein the gear housing is made of a resinous material to integrate the speed-reducing unit receiving portion and the circuit board receiving portion.

6. The motor according to claim 1, wherein the circuit board receiving portion has an insertion hole through which the control circuit board is installed therein.

7. The motor according to claim 6, wherein the insertion hole opens on a peripheral face of the circuit board receiving portion so that the control circuit board is inserted therethrough in a direction generally in parallel with the circuit board receiving portion.

8. The motor according to claim 1, wherein the control circuit board has an extending portion disposing a rotation sensor thereon for detecting a rotational speed of the rotation shaft.

9. The motor according to claim 8, wherein the rotation sensor is a pair of Hall elements.

10. The motor according to claim 1, wherein:
a plane of the control circuit board is tilted away from the second fictive plane; and
a distance, which is measured between the plane of the control circuit board and the second fictive plane in the direction parallel to the axis of the output shaft, increases in a direction radially away from the axis of the output shaft.

11. A motor for driving a regulator of a power window system installed in a vehicular door, the motor comprising:

a motor unit having a rotation shaft;
an output shaft that is rotated by the motor unit to drive the regulator;
a speed-reducing unit that reduces a speed of rotation supplied from the rotation shaft and transmits the rotation to the output shaft;
a control circuit board that controls the rotation of the rotation shaft; and
a gear housing fixed to the motor unit, wherein;
the gear housing includes a generally flat shaped speed-reducing unit receiving portion and a generally flat shaped circuit board receiving portion;
the speed-reducing unit receiving portion receives at least a part of the speed-reducing unit;
the circuit board receiving portion receives the control circuit board;
each of the speed-reducing unit receiving portion and the circuit board receiving portion extends from a center axis of the rotation shaft;
the speed-reducing unit receiving portion is disposed generally in parallel with a generally planar portion of the regulator, which extends generally perpendicular to an axis of the output shaft and is opposed to the circuit board receiving portion in a direction parallel to the axis of the output shaft;
the circuit board receiving portion is tilted away from the generally planar portion of the regulator; and
a distance, which is measured between the circuit board receiving portion and a plane of the generally planar portion of the regulator in the direction parallel to the axis of the output shaft, increases in a direction radially away from the axis of the output shaft.

12. A motor comprising:
a motor unit having a rotation shaft;
an output shaft that is rotated by the motor unit;
a speed-reducing unit that reduces a speed of rotation supplied from the rotation shaft and transmits the rotation to the output shaft;
a control circuit that controls the rotation of the rotation shaft; and
a gear housing fixed to the motor unit, wherein the gear housing includes a generally flat shaped speed-reducing unit receiving portion and a generally flat shaped circuit board receiving portion;
the speed-reducing unit receiving portion receives at least a part of the speed-reducing unit;
the output shaft extends outward beyond to one side face of the speed-reducing unit receiving portion in a direction generally perpendicular to the one side face of the speed-reducing unit receiving portion;
the circuit board receiving portion receives the control circuit board;
each of the speed-reducing unit receiving portion and the circuit board receiving portion radially extends from a center axis of the rotation shaft;
a side face of the circuit board receiving portion which is on the same side as the one side face of the speed reducing unit receiving portion, is tilted away from a fictive plane, which is generally parallel to the center axis of the rotation shaft and is generally perpendicular to an axis of the output shaft at a leading end of the output shaft; and
a distance, which is measured between the side face of the circuit board receiving portion and the fictive plane in a direction parallel to the axis of the output shaft, increases in a direction radially away from the axis of the output shaft.

13. A motor for driving a regulator of a power window system installed in a vehicular door, the motor comprising:
a motor unit having a rotation shaft;
an output shaft that is rotated by the motor unit to drive the regulator;
a speed-reducing unit that reduces a speed of rotation supplied from the rotation shaft and transmits the rotation to the output shaft;
a control circuit board that controls the rotation of the rotation shaft; and
a gear housing fixed to the motor unit, wherein;
the gear housing includes a generally flat shaped speed-reducing unit receiving portion and a generally flat shaped circuit board receiving portion;
the speed-reducing unit receiving portion receives at least a part of the speed-reducing unit;
the circuit board receiving portion receives the control circuit board;
each of the speed-reducing unit receiving portion and the circuit board receiving portion radially extends from a center axis of the rotation shaft;
the speed-reducing unit receiving portion is disposed generally in parallel with a generally planar portion of the regulator, which extends generally perpendicular to an axis of the output shaft and is opposed to a side face of the circuit board receiving portion in a direction parallel to the axis of the output shaft;
the side face of the circuit board receiving portion is tilted away from the generally planar portion of the regulator; and
a distance, which is measured between the side face of the circuit board receiving portion and a plane of the generally planar portion of the regulator in the direction parallel to the axis of the output shaft, increases in a direction radially away from the axis of the output shaft.

* * * * *